United States Patent
McGuigan et al.

(10) Patent No.: US 12,466,107 B2
(45) Date of Patent: Nov. 11, 2025

(54) GRANULATED FEEDSTOCK FOR ADDITIVELY MANUFACTURING CERAMIC COMPONENTS

(71) Applicant: General Electric Company, Schenectady, NY (US)

(72) Inventors: Henry Charles McGuigan, Duanesburg, NY (US); William Francis Navojosky, Ballston Spa, NY (US); Reza Sarrafi-Nour, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/451,321

(22) Filed: Aug. 17, 2023

(65) Prior Publication Data

US 2025/0058493 A1   Feb. 20, 2025

(51) Int. Cl.
| | |
|---|---|
| *B22F 10/20* | (2021.01) |
| *B28B 1/00* | (2006.01) |
| *B33Y 10/00* | (2015.01) |
| *B33Y 70/10* | (2020.01) |

(52) U.S. Cl.
CPC ............ *B28B 1/001* (2013.01); *B28B 1/004* (2013.01); *B28B 1/008* (2013.01); *B33Y 10/00* (2014.12); *B33Y 70/10* (2020.01)

(58) Field of Classification Search
None
See application file for complete search history.

(56) References Cited

U.S. PATENT DOCUMENTS

| | | | |
|---|---|---|---|
| 10,759,085 B2 | 9/2020 | Kasperchik et al. | |
| 10,781,512 B2 | 9/2020 | Konyashin et al. | |
| 2014/0291898 A1 | 10/2014 | Pujari et al. | |
| 2016/0339521 A1* | 11/2016 | Dardas | B22F 7/008 |
| 2019/0060993 A1 | 2/2019 | Bose et al. | |
| 2020/0047252 A1 | 2/2020 | Kritchman et al. | |
| 2021/0009473 A1 | 1/2021 | Yamada et al. | |

FOREIGN PATENT DOCUMENTS

| | | | |
|---|---|---|---|
| CN | 114671696 A | * | 6/2022 |
| CN | 114920565 A | | 8/2022 |
| CN | 115286394 A | | 11/2022 |
| DE | 102020124639 A1 | | 3/2022 |
| WO | WO2021097320 A1 | | 5/2021 |

* cited by examiner

*Primary Examiner* — Yung-Sheng M Tsui
(74) *Attorney, Agent, or Firm* — Dority & Manning, P.A.

(57) ABSTRACT

Methods for manufacturing a ceramic matrix composite (CMC) component are provided. The method may include building a plurality of successive layers of the ceramic component through a selective solidification of a composite feedstock comprising a plurality of composite granules and densifying the ceramic component through infiltration with silicon. Each of the plurality of composite granules comprises one or more silicon carbide particles and one or more carbon particles. Composite feedstocks are also provided, which may include a plurality of composite granules with each of the plurality of composite granules comprises one or more silicon carbide particles and one or more carbon particles.

20 Claims, 4 Drawing Sheets

GRANULATED FEEDSTOCK FOR ADDITIVELY MANUFACTURING CERAMIC COMPONENTS

FIELD

The present disclosure relates to additively manufacturing ceramic matrix components.

BACKGROUND

Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio and are able to retain this attribute over a broader range of operating temperature than super alloys. This renders them attractive in high-temperature applications in which weight is a concern, such as in aeronautic applications involving high temperature structures. Their stability at high temperatures renders CMCs also very suitable in applications in which components are in contact with a high-temperature gas, such as in a gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "turbomachine" refers to a machine including one or more compressors, a heat generating section (e.g., a combustion section), and one or more turbines that together generate a torque output.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc.

As used herein, ceramic matrix composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, or subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, structural elements of thermal protection systems, aerodynamic control surfaces such as a fin, or other like components, that would benefit from the lighter-weight and higher temperature capability these materials can offer.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Binder Jet Printing (BJP), and other additive manufacturing technologies that utilize an energy beam or other energy source to bond or solidify into a shape an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer may be, for example, between about 10 m and 200 m, although the thickness may be determined based on any number of parameters and may be any suitable size.

As used herein, the term "build plane" refers to a plane defined by a surface upon which an energy beam impinges to selectively irradiate and thereby bond or consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of powder material into a collective structure, such as a result of binding or irradiating the powder material, including by way of melting, bonding, fusing, joining, sintering, or the like.

The present disclosure is generally related to manufacturing ceramic matrix composite (CMC) components using additive manufacturing.

Manufacturing ceramic components often involves aligning layers of a fiber reinforcement material to be processed into a final product. The layers may be formed using sheets of reinforcement materials pre-impregnated with ceramic or pre-ceramic materials. Furthermore, ceramic or pre-ceramic materials may additionally or alternatively be added during or after alignment or the layup processes. However, the shape and size of the ceramic components may be limited as a result of the geometry of the original layups, thereby rendering complex geometries for ceramic components difficult to achieve.

Additive manufacturing may be incorporated into CMC manufacturing, such as for large hybrid CMC structures that have an additively manufactured core laminated with CMC overlays. Additive manufacturing allows for the layer-by-layer building of a green body structure, potentially having more complex geometries such as a honeycomb pattern or a component with cooling channels and holes. After printing, the green body structure may be subjected to a curing or burnout process to remove binder material from the component. Subsequently, the component can be densified, such as through silicon infiltration, reaction-bonding, chemical vapor infiltration, and other densification methods to reduce porosity in the component.

However, the feedstock material used for additive manufacturing ceramic components, such as the core structure of such ceramic components, consists of monolithic ceramic feedstock powder. For instance, the feedstock may utilize monolithic SiC, $Si_3N_4$, or mullite pellets. While the feedstock may provide the core requisite chemical constituents, the large size of the monolithic particles can ultimately lead to high porosity of the green body and high shrinkage of the component during densification. Moreover, the single material particles or pellets may result in inefficient processing, such as reaction bonding via melt-infiltration that produces a large amount of free silicon, thereby inhibiting performance of the component at high temperatures.

Thus, the disclosure herein provides a new processing approach to manufacturing ceramic components. Instead of additively manufacturing ceramic components using monolithic feedstock, new composite feedstock can be utilized which, for the example of a reaction-bonded silicon carbide structure formed by reactive silicon melt infiltration, incorporates both silicon carbide and carbon particles hence providing a reactive pellet system. The pre-granulation of the combined particles enables the pellets to be of sufficient size to be conducive for additive manufacturing modalities, such as by being large enough to maintain good flowability of the feedstock material. Moreover, the formation of composite granules enables tailoring of the chemical composition in the overall feedstock. This, in turn, can help adjust the properties of the ceramic component by tailoring both the composition and the microstructure of the additive manufactured component, such as by reducing the amount of free silicon produced during densification.

Figure 1:
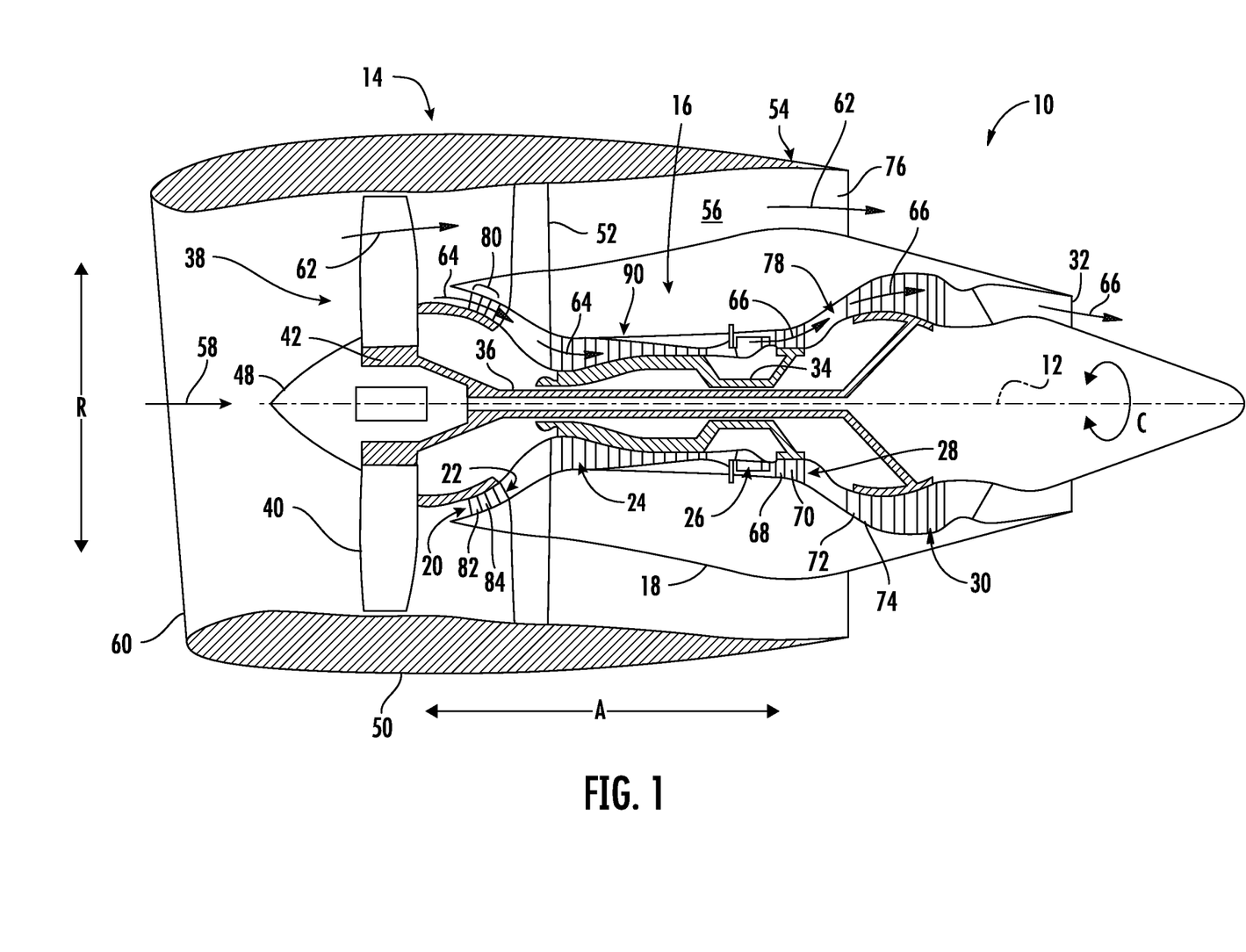
FIG. 1 is a schematic cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary aspect of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a circumferential direction C (extending about the longitudinal centerline 12 and the axial direction A), and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a hub or disk 42 in a spaced apart manner. As depicted, fan blades 40 extend outward from disk 42 generally along the radial direction R. The fan blades 40 and disk 42 are together rotatable about the longitudinal centerline 12 by LP shaft or spool 36. In some embodiments, a power gear box having a plurality of gears may be included for stepping down the rotational speed of the LP shaft or spool 36 to a more efficient rotational fan speed.

Referring still to the exemplary embodiment of FIG. 1, the disk 42 is covered by a rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the compressor section and into the combustion section 26, where it is mixed with fuel and burned to provide combustion gases 66. More particularly, the compressor section includes the LP compressor 22 and the HP compressor 24 that each may comprise a plurality of compressor stages 80, with each stage 80 including both an annular array or circumferential row of stationary compressor vanes 82 (also referred to as compressor stator vanes 82) and an annular array or circumferential row of rotating compressor blades 84 (also referred to as compressor rotor blades 84) positioned immediately downstream of the compressor vanes 82. The plurality of compressor blades 84 in the LP compressor 22 are coupled to the LP shaft or spool 36, and the plurality of compressor blades in the HP compressor 24 are coupled to the HP shaft or spool 34. The plurality of compressor vanes 82 in the LP compressor 22 are coupled to a compressor casing, and the plurality of compressor vanes 82 in the HP compressor 24 are coupled to a compressor casing; at least a portion of the HP compressor vanes 82 are coupled to compressor casing 90. In some embodiments, the compressor casing 90 may extend through both the LP compressor 22 and the HP compressor 24 and support all of the compressor vanes 82. In other embodiments, the compressor casing 90 supports only a portion of the compressor vanes 82 and may support only a portion of the compressor vanes 82 in the HP compressor 24. As previously described, as the second portion of air 64 passes through the sequential stages of compressor vanes 82 and compressor blades 84, the volume of air 64 is pressurized, i.e., the pressure of the air 64 is increased prior to combustion with fuel in the combustion section 26 to form the combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although the gas turbine engine of FIG. 1 is depicted in a turboshaft configuration, it will be appreciated that the teachings of the present disclosure can apply to other types of turbine engines, turbomachines more generally, and other shaft systems. For example, the turbine engine may be another suitable type of gas turbine engine, such as e.g., a turboprop, turbojet, turbofan, aeroderivatives, etc. The present disclosure may also apply to other types of turbomachinery, such as e.g., steam turbine engines. Further, the present disclosure may apply to other types of composite components, such as those used in applications other than turbomachinery.

FIGS. 2A-2E are schematic illustrations of different potential stages for producing composite feedstock, such as for additively manufacturing ceramic matrix composite ("CMC") components, according to example embodiments of the present disclosure. FIGS. 2A-2E are intended to represent pellets and powders for identification and description and are not intended to represent the actual shapes or the structures to physical or relative scale. Moreover, FIGS. 2A-2E depict example process steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

Figure 2A:
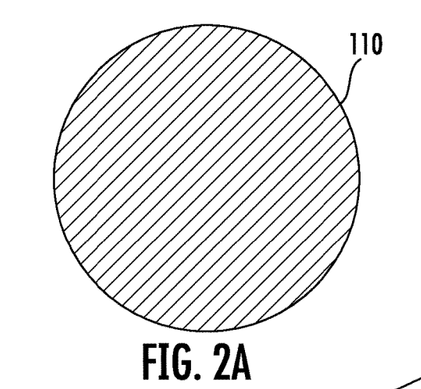
FIG. 2A is a schematic illustration of a silicon carbide pellet, as an exemplary source material for producing composite feedstock in accordance with an exemplary aspect of the present disclosure.

In FIG. 2A, a silicon carbide pellet 110 is illustrated as an exemplary starting material for SiC. The silicon carbide pellet may have a size, shape, and chemistry that may be suitable for additive manufacturing, such as for additive manufacturing a ceramic component comprising silicon carbide core structures. For instance, the silicon carbide pellet may have a size large enough to be utilized as the powder material for layer-by-layer deposition during additive manufacturing (e.g., desired fluidity properties). The silicon carbide pellet may also comprise a small enough size that it is conducive for deposition, solidification, reaction bonding or a combination thereof during additive manufacturing.

In some examples, the silicon carbide pellet 110 may have a pellet size, wherein pellet size refers to the largest dimension across the pellet, of 20 µm to 80 µm, or 30 µm to 70 µm, or 40 µm to 60 µm, or be around 50 µm. A plurality of silicon carbide pellets 110 can be collectively included as a feedstock of silicon carbide for additive manufacturing. Within the feedstock, the respective silicon carbide pellets 110 can possess some variations, such as having different sizes, shapes, or compositions. For instance, the average pellet size (i.e., the average of the largest dimension for each of the pellets) for the silicon carbide pellets 110 may fall within a broad or narrow range of different sizes. In some examples, the silicon carbide pellets 110 may have an average pellet size that falls within a range of 20 µm to 80 µm, or from 30 µm to 70 µm, or from 40 µm to 60 µm, or all have an average particle size of around 50 µm.

The silicon carbide pellet 110 can be processed from a plurality of smaller silicon carbide particles. The processing of silicon carbide into small sizes enables the subsequent tailoring and production of composite granules that combine silicon carbide with one or more other materials. However, while FIG. 2A illustrates silicon carbide in pellet form, such as a collective feedstock of a plurality of silicon carbide pellets, the silicon carbide material may also be provided in other forms without deviating from the scope of the present disclosure. In addition, the silicon carbide pellet 110 may contain plurality of other carbide phases such as other transition metal carbides (e.g., $B_4C$, VC, MoC, TiC, or combinations thereof) and their alloys.

Figure 2B:
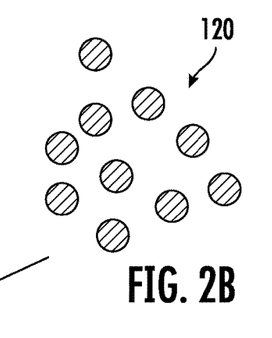
FIG. 2B is a schematic illustration of a plurality of silicon carbide particles, such as from being derived from the silicon carbide pellet illustrated in FIG. 2A.

In FIG. 2B, a plurality of silicon carbide particles 120 are illustrated, such as from being derived from the silicon carbide pellet 110 illustrated in FIG. 2A or by other methods. For example, the silicon carbide pellet 110 may be milled (e.g., ball milled) to form the plurality of silicon carbide particles 120 with smaller average particle sizes. The milling process may be performed with any suitable media, provided that the media does not alter the chemistry of the silicon carbide within the silicon carbide pellets 110 forming the silicon carbide particles 120. The silicon carbide particles 120 can comprise a plurality of particles comprising silicon carbide. The silicon carbide particles 120 can be of smaller sizes than the original silicon carbide pellet 110. For instance, the silicon carbide particles 120 may have an average particle size, wherein particle size refers to the largest dimension across an individual particle, and average particle size refers to the average of the largest dimension for each particle, of 0.1 µm to 10 µm, or from 0.5 µm to 5 µm, or be around 1 µm. Moreover, the plurality of silicon carbide particles 120 can all comprise the same particle size, or may vary within a range of sizes.

While FIGS. 2A and 2B illustrate a single silicon carbide pellet 110 being processed into a plurality of silicon carbide particles 120, the singularity of the illustrated silicon carbide pellet 110 is for convenience only. That is, a plurality of silicon carbide pellets 110 may be processed collectively to produce a plurality of silicon carbide particles 120, wherein the silicon carbide particles 120 have a smaller size than the original silicon carbide pellets 110. Alternatively, the plurality of silicon carbide particles 120 may be directly provided without requiring the initial processing of larger silicon carbide pellets 110.

With the larger silicon carbide pellets 110 being processed into smaller silicon carbide particles 120, the silicon carbide particles 120 can subsequently combined with one more additional elements such as additional particles comprising other compositions.

Figure 2C:
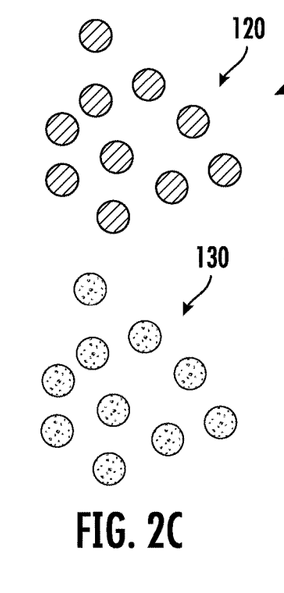
FIG. 2C is a schematic illustration of a plurality of silicon carbide particles, such as in FIG. 2B, for combination with a plurality of carbon particles.

In FIG. 2C, the plurality of silicon carbide particles 120 are illustrated for combination with a plurality of carbon particles 130. The plurality of carbon particles 130 can comprise a plurality of particles comprising or consisting of carbon. Moreover, the plurality of carbon particles 130 may have an average particle size that is larger than, less than, or similar to the average particle size of the silicon carbide particles 120. For instance, carbon particles 130 may have a particle size, wherein particle size refers to the largest dimension across an individual particle, and average particle size refers to the average of the largest dimension for each particle, of 0.1 µm to 10 µm, or 0.5 µm to 5 µm, or be around 1 µm. Moreover, the plurality of carbon particles 130 can all comprise the same size, or may vary within a range of sizes.

The silicon carbide particles 120 and the carbon particles 130 can be mixed using any suitable process to provide a uniform distribution of the different types of particles. Once mixed, or while being mixed, the silicon carbide particles 120 and the carbon particles 130 can be formed into composite granules, such as via spray dry methods, pressing or other compaction methods.

Figure 2D:
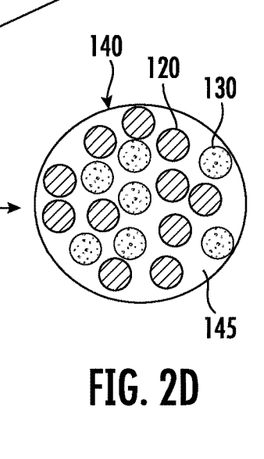
FIG. 2D is a schematic illustration of a composite granule formed from a combination of one or more silicon carbide particles and one or more carbon particles, such as in FIG. 2C.

In FIG. 2D, a composite granule 140 is illustrated. The composite granule 140 comprises a combination of one or more silicon carbide particles 120 and one or more carbon particles 130 that can be utilized for subsequent additive manufacturing and the ultimate formation of a ceramic component.

The composite granules 140 may be formed using any suitable process. For instance, the composite granule 140 may include a binder 145 to help hold the silicon carbide particles 120 and carbon particles 130 together in granular form. For instance, in some non-limiting embodiments one or more aqueous or non-aqueous binder systems may be used. Exemplary aqueous binder systems include, but are not limited to, polyvinyl alcohol (PVA), polymethyl meta acrylate (PMMA), carboxy methyl cellulose (CMC) and similar compounds. An exemplary non-aqueous binder systems includes, but is not limited to, include high-molecular-weight.

Moreover, one or more additional elements may be further included in the composite granule 140. The one or more additional elements may be included that assist in subsequent additive manufacturing, the formation of a ceramic component, or a combination thereof. For instance, in some examples, the composite granule 140 may comprise silicon.

Figure 2E:
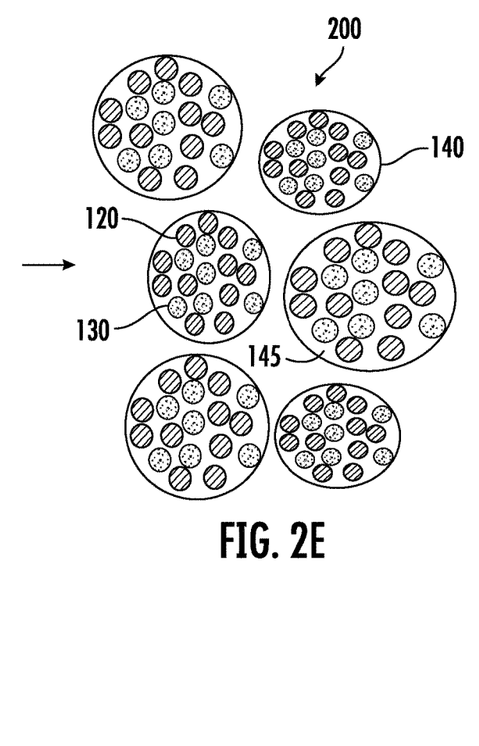
FIG. 2E is a schematic illustration of a plurality of composite granules, such as in FIG. 2D, forming a composite feedstock.

In FIG. 2E, a plurality of composite granules 140 are illustrated forming a composite feedstock 200. The composite granules 140 can each contain one or more silicon carbide particles 120 and carbon particles 130. Moreover, the composite granules 140 can each contain a binder.

By recombining the smaller silicon carbide particles 120 and carbon particles 130 into composite granules 140, the composite feedstock 200 can have the size and physical characteristics suitable for additive manufacturing, while still combining the silicon carbide and carbon materials. Moreover, the composite feedstock 200 can be tailored based on the needs and desired properties of the ceramic component.

The composite feedstock 200 may comprise one or more additional materials such as other refractory metals such as B, Mo, W, V and Ti or transition metal carbides such as or $B_4C$, VC, MoC, TiC, either in one or more of the composite granules 140 themselves, or as separate pellets mixed in with the composite granules. For instance, in some examples, the composite feedstock 200 can comprise silicon, such as by incorporating silicon in one or more of the composite granules 140.

The composite granules 140 and overall composite feedstock 200 can be adjusted to provide the desired material distribution. For instance, in some examples, the composite feedstock 200 can comprise on solid basis, from 5 to 95 weight percent silicon carbide, from 25 to 90 weight percent silicon carbide, or from 40 to 80 weight percent silicon carbide. In some examples, the composite feedstock 200 can comprise on solid basis, from 10 to 90 weight percent carbon, from 20 to 60 weight percent carbon, or from 30 to 50 weight percent carbon. In some examples, the balance of solid particles may be provided by other metallic elements, or carbide or boride compounds such as those described herein.

The composite granules 140 can be shaped and sized to facilitate additive manufacturing. For instance, each of the composite granules 140 may have a pellet size, wherein pellet size refers to the largest dimension across the pellet, of 20 µm to 80 µm, or from 30 µm to 70 µm, or from 40 µm to 60 µm, or be around 50 µm.

Within the composite feedstock, the respective composite granules 140 can possess some variations, such as having different sizes, shapes, or compositions. For instance, the average pellet size for the different composite granules 140 may fall within a broad or narrow range of different sizes. In some examples, the composite granules 140 may have an average pellet size (referring to the average of the largest dimension for each pellet) of 20 µm to 80 µm, or of 30 µm to 70 µm, or of 40 µm to 60 µm, or all have an average pellet size of around 50 µm.

The composite feedstock can subsequently be utilized to additively manufacture a ceramic component, or a part of a ceramic component such as a monolithic core. That is, additive manufacturing facilitates the building a plurality of successive layers of the ceramic component through the selective solidification of the composite feedstock, which comprises both the silicon carbide and carbon materials. By using the composite granules, the printed component can have a lower porosity thereby reducing shrinkage during subsequent processing steps such as curing. Moreover, the tailoring of the chemical composition enabled by the composite feedstock can facilitate reduced net shrinkage through reaction amongst the ingredients, as well as lower free silicon during subsequent densification through melt infiltration with molten silicon.

Any suitable additive manufacturing process may be used. For instance, in some examples, the component may be additively manufactured using the composite granules via binder jet printing (BJP), powder bed fusion (PBF), direct metal laser melting (DMLM) technology, a selective laser melting (SLM) technology, a directed metal laser sintering (DMLS) technology, or a selective laser sintering (SLS) technology, fused deposition melting (FDM) technology, direct energy deposition (DED) technology, laser engineered net shaping (LENS) technology, laser net shape manufacturing (LNSM) technology, Digital Light Processing (DLP) technology.

After printing the initial component using the composite feedstock, the component can undergo one or more additional processing steps, such as resin or pre-ceramic polymer impregnation and curing followed by burnout to remove any binder, and densification via infiltration of molten silicon. For instance, the component produced from BJP and DLP additive manufacturing may be a green body comprising binder. The green body may undergo a curing process followed by a burnout step of the binder material to provide what is considered a porous component. The porous component can comprise the silicon carbide, carbon and other constituents from the initial composite feedstock.

The porous component can then undergo densification to reduce its porosity. Densification can occur through infiltration of the pores using a densifying material, such as silicon, silicon-containing reactants, a silicon alloy, or reactive vapor constituents of Si, such as SiO (g), $SiH_4$ and $SiCl_4$. In some examples, densification may comprise melt infiltration (MI) where the component is infiltrated with molten silicon, such that molten silicon is the densification fluid. In some examples, densification may comprise chemical vapor infiltration (CVI) whereby the component is infiltrated into a fibrous preform by the use of reactive gases at elevated temperature to form the fiber-reinforced composite, such that the reactive gases are the densification fluid. In some examples, densification may comprise polymer infiltration and pyrolysis (PIP), where the component is infiltrated with a preceramic polymer, such as polysilazane, and then heat treated to form a SiC matrix, such that the preceramic polymer is the densification fluid. In some examples, densification may comprise an oxide/oxide processes (e.g., for aluminum or alumino-silicate reinforcement material components). In some example, densification may comprise a combination of these processes.

Figure 3:
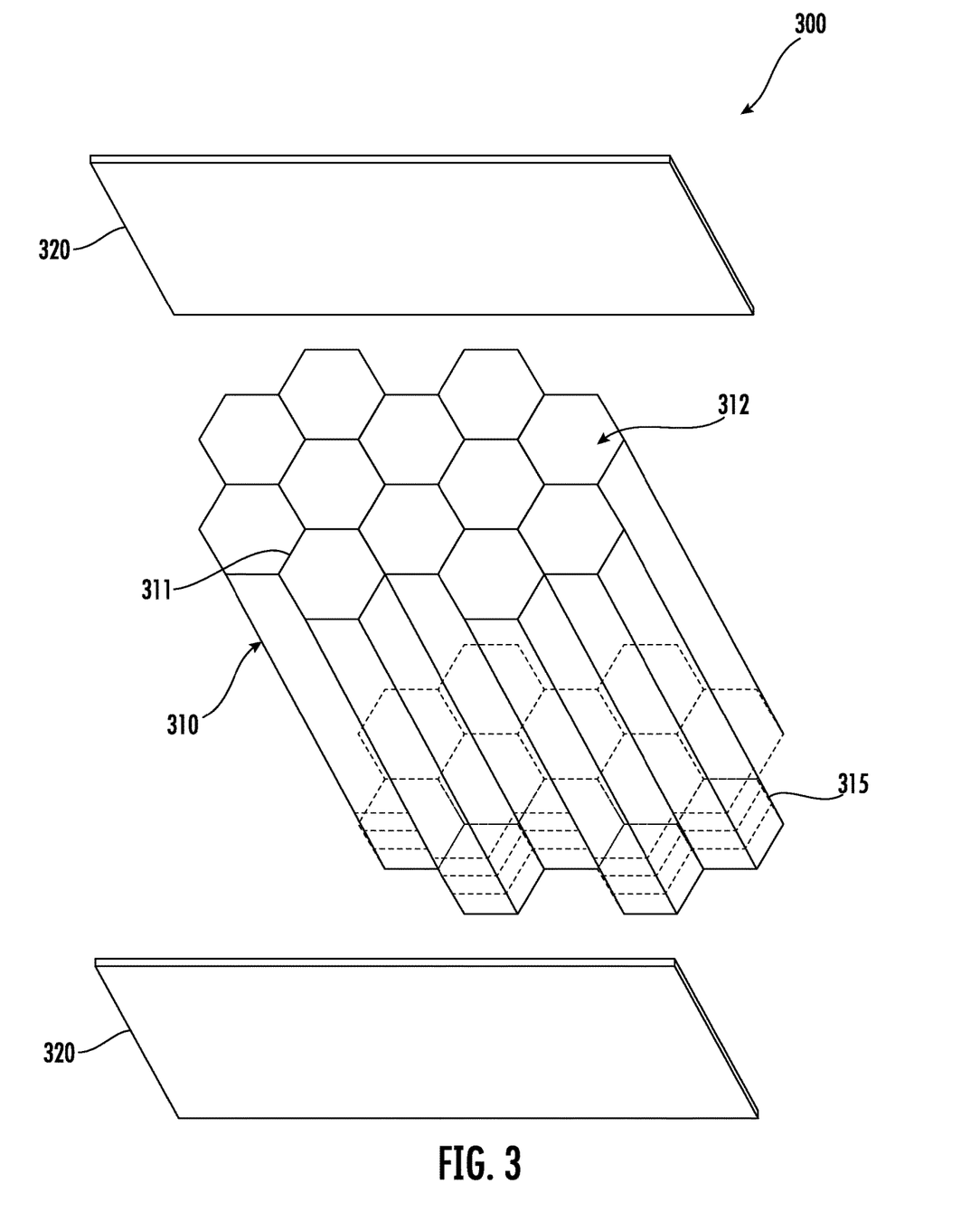
FIG. 3 is exploded perspective view of an exemplary ceramic component in accordance with an exemplary aspect of the present disclosure.

FIG. 3 illustrates an exploded perspective view of an exemplary ceramic component 300 that can be produced using the processes and materials disclosed herein. While FIG. 3 depicts a particular configuration of the ceramic component 300, those of ordinary skill in the art, using the disclosures provided herein, will understand that the alternative components or configurations can be adapted without deviating from the scope of the present disclosure.

The ceramic component 300 illustrated in FIG. 3 generally includes a monolithic core 310 and one or more composite plies 320. The monolithic core 310 can be configured as a honeycomb structure comprising a plurality of walls 311 defining a plurality of hollow passageways 312.

The monolithic core 310 can be additively manufactured using the composite feedstock disclosed herein. That is, the monolithic core 310 may be additively manufactured by building a plurality of successive layers 315 through the selective solidification of the composite feedstock. Solidification can comprise joining, sintering, bonding, or otherwise consolidating material of the composite feedstock together via Si melt infiltration, reaction bonding, CVI and PIP processes or their combinations.

The one or more composite plies 320 can comprise an adjacent composite component, such as one comprising a similar composition to the monolithic core, or a different composition from the monolithic core. In some examples, the composite plies 320 may be laid up on the surface of the monolithic core 310. Such examples provide for additively manufacturing the complex monolithic core 310, but also utilize incorporation of a less time intensive layup process for the composite plies. In some examples, both the monolithic core 310 and the composite plies 320 can be additively manufactured, either as a single integral piece or as separate pieces for subsequent joining. The composite plies 320 may then be joined to the monolithic core 310 to provide the overall ceramic component.

Figure 4:
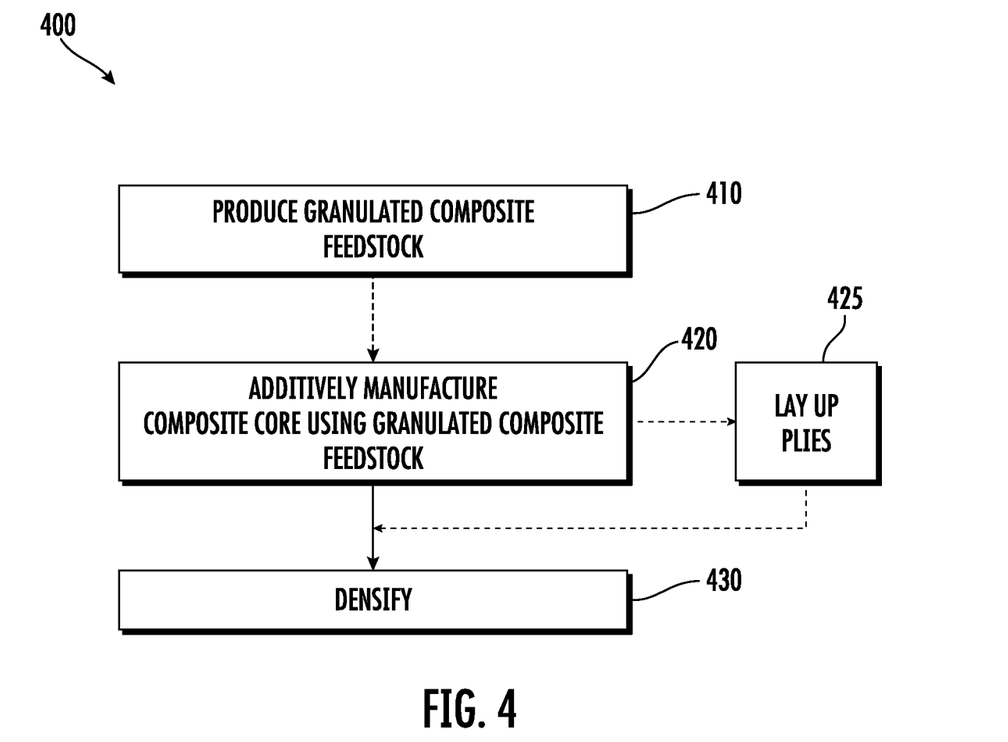
FIG. 4 provides a flowchart diagram showing an exemplary method of additively manufacturing a ceramic component in accordance with an exemplary aspect of the present disclosure.

FIG. 4 provides a flowchart for a method 400 of manufacturing a ceramic component according to example embodiments of the present disclosure. FIG. 4 depicts example process steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

The method 400 may optionally include producing the composite feedstock in step 410. As disclosed herein, producing the granulated feedstock can include combining a plurality of silicon carbide particles with a plurality of carbon particles. One or more other materials may also be incorporated such as a binder, silicon, or both. Alternatively, the composite feedstock may be produced independent of the manufacturing of the ceramic component.

Method 400 further comprises additively manufacturing the ceramic component in step 420. As disclosed herein, additively manufacturing the ceramic component can include building a plurality of successive layers of the ceramic component through a selective solidification of a composite feedstock comprising a plurality of composite granules, wherein each of the plurality of composite granules comprises one or more silicon carbide particles and one or more carbon particles. Thus, the ceramic component formed may be a substantially monolithic component that includes the material of the composite feedstock substantially uniformly distributed therein. In an alternative embodiment, the ceramic component formed may have a multi-phase ceramic component, such as a CMC.

Optionally, method 400 may further comprise laying up one or more composite plies in step 425 on the component additively manufactured in step 420. For instance, the component additively manufactured in step 420 may comprise a core, and one or more CMC plies may be laid up on the core in step 425. The core and plies may be joined to one another, either before, during, or after subsequent processing steps such as densification.

Method 400 further comprises densification in step 430 of the component additively manufactured in step 420. Densification can occur through infiltration of silicon, such as through melt infiltration or chemical infiltration. In some embodiments, the component additively manufactured in step 420 may undergo a curing or burnout process to remove binder material prior to densification in step 430. The method 400 of manufacturing can thus produce a ceramic component that has reduced shrinkage during processing, less free silicon from densification, and other potentially tailorable properties as a result of the composite feedstock.

Further aspects are provided by the subject matter of the following clauses:

A method for manufacturing a ceramic matrix composite (CMC) component, the method comprising: building a plurality of successive layers of the ceramic component through a selective solidification of a composite feedstock comprising a plurality of composite granules, wherein each of the plurality of composite granules comprises one or more silicon carbide particles and one or more carbon particles; and densifying the ceramic component through infiltration with silicon.

The method of any preceding clause, wherein each of the plurality of composite granules further comprises a binder.

The method of any preceding clause, wherein each of the plurality of composite granules further comprises silicon.

The method of any preceding clause, wherein the composite feedstock comprises from 50 to 95 weight percent silicon carbide.

The method of any preceding clause, wherein the composite feedstock comprises from 5 to 50 weight percent carbon.

The method of any preceding clause, wherein the composite feedstock comprises from 5 to 35 weight percent silicon.

The method of any preceding clause, wherein the plurality of composite granules of the composite feedstock has an average pellet size of 5 μm to 75 μm.

The method of any preceding clause, further comprising combining a plurality of silicon carbide particles with a plurality of carbon particles to form the plurality of composite granules.

The method of any preceding clause, wherein the plurality of silicon carbide particles has an average particle size of 0.1 μm to 10 μm.

The method of any preceding clause, wherein the plurality of carbon particles has an average particle size of 0.1 μm to 10 μm.

The method of any preceding clause, wherein building the plurality of successive layers of the ceramic component comprises solidifying the composite feedstock via binder jet printing or digital light processing.

The method of any preceding clause, wherein densifying the ceramic component comprises melt infiltration with molten silicon or chemical vapor infiltration.

The method of any preceding clause, further comprising laying up one or more composite plies on the component, and joining the one or more composite plies to form the ceramic component.

The method of any preceding clause, wherein the ceramic component is a turbine component or a structural or aerodynamic component designed for service as component of a high temperature propulsion and/or hot-gas flow trajectory control system.

A method for manufacturing a ceramic matrix composite (CMC) component, the method comprising: building a plurality of successive layers of the CMC component through a selective solidification of a composite feedstock, wherein the composite feedstock comprises a plurality of composite granules formed from the combination of one or more silicon carbide particles and one or more carbon particles, wherein the composite feedstock comprises from 5 to 95 weight percent silicon carbide and from 5 to 40 weight percent carbon; and densifying the ceramic component through infiltration with silicon or silicon-containing reactants.

The method of any preceding clause, further comprising: combining a plurality of silicon carbide particles having an average particle size of 0.1 μm to 10 μm with a plurality of carbon particles having an average particle size of 0.1 μm to 10 μm to form the plurality of composite granules.

The method of any preceding clause, wherein the composite feedstock further comprises from 5 to weight 35 percent silicon.

The method of any preceding clause, wherein the plurality of composite granules of the composite feedstock have an average pellet size of 5 μm to 75 μm.

A composite feedstock comprising: a plurality of composite granules, wherein each of the plurality of composite granules comprises one or more silicon carbide particles and one or more carbon particles; wherein the composite feedstock comprises from 5 to 95 weight percent silicon carbide and from 5 to 40 weight percent carbon; and wherein the plurality of composite granules of the composite feedstock has an average pellet size of 5 μm to 75 μm.

The composite feedstock of any preceding clause, wherein one or more of the plurality of composite granules further comprises a binder.

The composite feedstock of any preceding clause, wherein one or more of the plurality of composite granules further comprises silicon.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for manufacturing a ceramic matrix composite (CMC) component, the method comprising:
    building a plurality of successive layers of the CMC component through a selective solidification of a composite feedstock comprising a plurality of composite granules, wherein each of the plurality of composite granules comprises one or more silicon carbide particles and one or more carbon particles, and wherein the composite feedstock comprises one or more of Mo, W, V, Ti, B$_4$C, VC, MoC, or TiC in one or more of the composite granules or as pellets combined with the composite granules; and
    densifying the CMC component through infiltration with silicon.

2. The method of claim 1, wherein each of the plurality of composite granules further comprises a binder.

3. The method of claim 2, wherein each of the plurality of composite granules further comprises elemental silicon.

4. The method of claim 1, wherein the composite feedstock comprises from 50 to 95 weight percent silicon carbide.

5. The method of claim 4, wherein the composite feedstock comprises from 5 to 50 weight percent carbon.

6. The method of claim 5, wherein the composite feedstock comprises from 5 to 35 weight percent elemental silicon.

7. The method of claim 1, wherein the plurality of composite granules of the composite feedstock has an average pellet size of 5 μm to 75 μm.

8. The method of claim 1, further comprising combining a plurality of silicon carbide particles with a plurality of carbon particles to form the plurality of composite granules.

9. The method of claim 8, wherein the plurality of silicon carbide particles has an average particle size of 0.1 μm to 10 μm.

10. The method of claim 9, wherein the plurality of carbon particles has an average particle size of 0.1 μm to 10 μm.

11. The method of claim 1, wherein building the plurality of successive layers of the CMC component comprises solidifying the composite feedstock via binder jet printing or digital light processing.

12. The method of claim 1, wherein densifying the CMC component comprises melt infiltration with molten silicon or chemical vapor infiltration.

13. The method of claim 1, further comprising laying up one or more composite plies on the CMC component, and joining the one or more composite plies to form the CMC component.

14. The method of claim 1, wherein the CMC component is a turbine component.

15. A method for manufacturing a ceramic matrix composite (CMC) component, the method comprising:
building a plurality of successive layers of the CMC component through a selective solidification of a composite feedstock, wherein the composite feedstock comprises a plurality of composite granules formed from the combination of one or more silicon carbide particles and one or more carbon particles, wherein the composite feedstock comprises from 5 to 95 weight percent silicon carbide and from 5 to 40 weight percent carbon, and wherein the composite feedstock comprises one or more of Mo, W, V, Ti, B4C, VC, MoC, or TiC in one or more of the composite granules or as pellets combined with the composite granules; and
densifying the CMC component through infiltration with silicon or silicon-containing reactants.

16. The method of claim 15, wherein the composite feedstock further comprises from 5 to 35 weight percent silicon.

17. The method of claim 15, wherein the plurality of composite granules of the composite feedstock has an average pellet size of 5 μm to 75 μm.

18. A composite feedstock comprising:
a plurality of composite granules, wherein each of the plurality of composite granules comprises one or more silicon carbide particles and one or more carbon particles; and
one or more of Mo, W, V, Ti, $B_4C$, VC, MoC, or TiC in one or more of the composite granules or as pellets combined with the composite granules;
wherein the composite feedstock comprises from 5 to 95 weight percent silicon carbide and from 5 to 40 weight percent carbon; and
wherein the plurality of composite granules of the composite feedstock has an average pellet size of 5 μm to 75 μm.

19. The composite feedstock of claim 18, wherein one or more of the plurality of composite granules further comprises a binder.

20. The composite feedstock of claim 18, wherein one or more of the plurality of composite granules further comprises elemental silicon.

* * * * *